United States Patent Office.

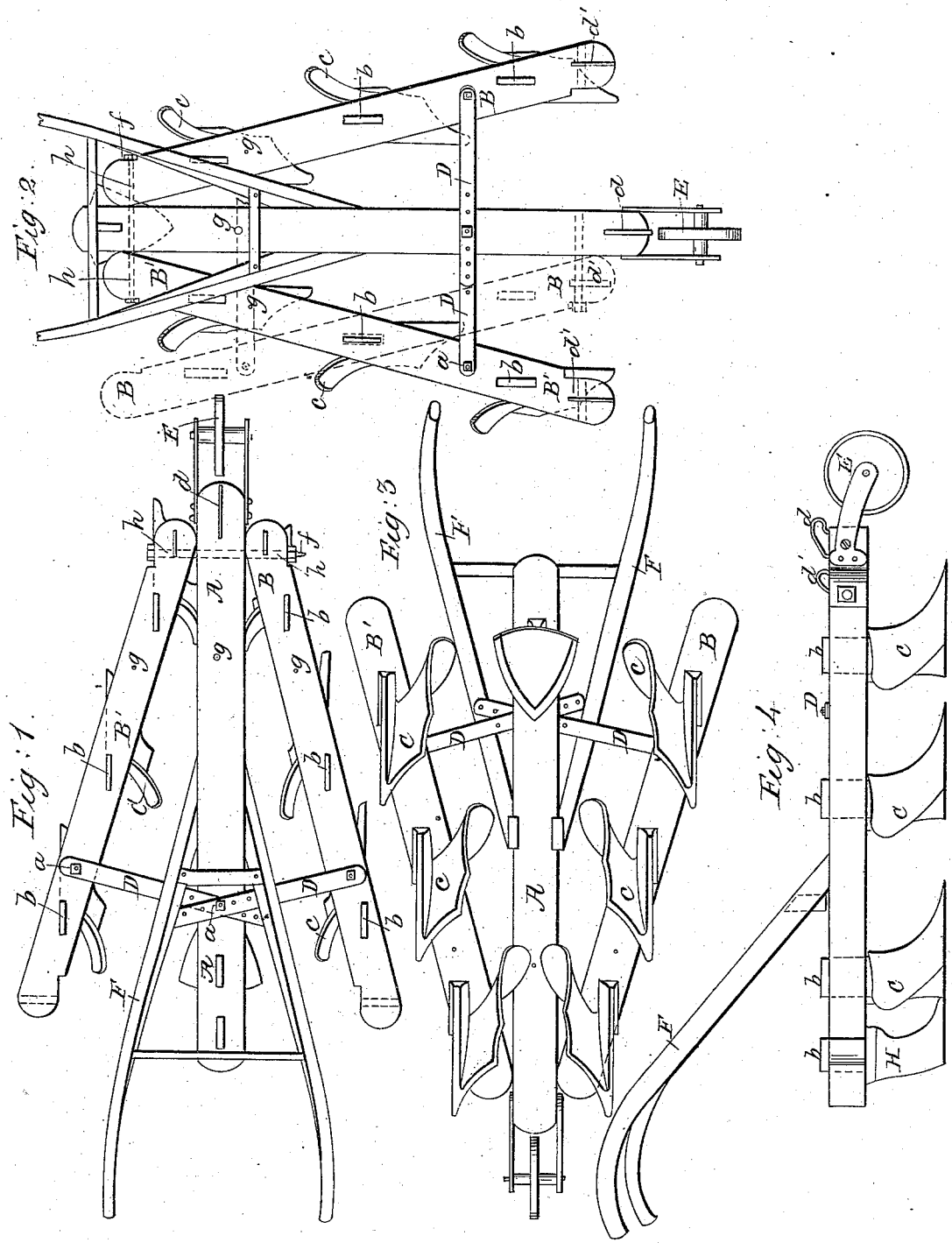

ROBERT I. BURBANK, OF BOSTON, MASSACHUSETTS.

*Letters Patent No. 86,502, dated February 2, 1869.*

IMPROVEMENT IN CULTIVATORS.

The Schedule referred to in these Letters Patent and making part of the same.

*To all whom it may concern:*

Be it known that I, ROBERT I. BURBANK, of Boston, in the county of Suffolk, and State of Massachusetts, have invented certain new and useful Improvements in Cultivators, of which the following is a full, clear, and exact description, reference being had to the accompanying drawings, making part of this specification, in which—

Figure 1 represents a plan or top view as arranged for plowing inward.

Figure 2, a similar view as arranged for plowing outward, the plow-beams having been changed from one side of the centre-beam to the other.

Figure 3 is a bottom side view of fig. 1.

Figure 4, a side elevation of fig. 2.

This invention relates to certain new and useful improvements in cultivators, which are used for loosening or working the soil between the rows of corn, cotton, cane, or other growing crops, and has for its object not only to loosen or work the surface-soil, but to cut under, at the required depth, the earth and weeds between the rows of corn, cotton, cane, &c., and, in small furrows inward or outward, to turn the earth completely over, and the weeds thus cut under completely under, thus burying the weeds and all the manure which had remained on the surface, so as to prevent evaporation and drying up of the manure, and to cause immediate decomposition of the weeds and undecomposed manure thus plowed under, and to enrich the superincumbent earth by the rising up through the same of the gases caused by said decomposition, and also to bring to the surface a portion of the underlying cold and clayey soil, to be warmed and enriched by the action of the sun and atmosphere.

This invention consists in the peculiar construction of the outward beams, which carry the plows and the centre-beam, and their relative arrangement with and adaptation to each other, whereby the position of the outer beams may be changed, or, in other words, each outer beam may be changed to the opposite side of the centre-beam and connected to the opposite end of the latter, so that the plows may be made to turn their furrows outward or inward, without being removed from their beams, where they are firmly secured.

In the use of the ordinary cultivators, the outer beams, which carry the teeth or other devices for working the surface-soil, are connected or attached only to one end of the centre-beam, or (in case only two beams are used) to each other, and they require no other connection or arrangement, since the teeth act equally in either direction, that is, outward and inward, simply working the surface-soil and loosening the roots of the weeds without turning them over or under. Such teeth rake up or bring to the surface the slightly-buried manure and other vegetable substances, where evaporation depreciates and exhausts uselessly a very large percentage of the gaseous and nutritious properties thereof.

To perform the operation of turning furrows, and thereby covering the surface, manure, weeds, &c., and of plowing either outward or inward, as may be desired, I construct my improved cultivator with a centre (or draught) beam, A, of suitable proportions to receive and sustain the fastenings for the connecting-parts, and to support them and the handles permanently.

Two removable and changeable outer beams, B and B', are connected with the beam A, at either end thereof, by a bolt or rod, $h$, passing through them, and fastened by a screw and nut, $f$.

These plow-beams carry the plows C, which are firmly secured in or to the beams by a tenon or shank, $b$, rising from the top of each plow and passing into and through a mortise in the beam.

Removable and changeable braces or stays, D, are attached to the plow-beams and to the centre-beam and screw-bolts and nuts $a$, for the purpose of holding the detached ends of the plow-beams outward or inward, and keeping the straight or guiding sides of the plows parallel with the centre-beam and the line of draught, and these braces or stays are adjustable on the centre-beam by holes or slots, $c$, made through each brace or stay for the reception of the bolt $a$ in the centre-beam, by which means the detached ends of the plow-beams may be set off from the centre-beam at a greater or less distance, according to the width to be plowed between the rows, the connected ends of said plow-beams being rounded, as shown, and the bolt-holes slightly enlarged at the inner sides of the plow-beams, to admit of the latter being thus adjusted.

The usual adjustable wheel E is arranged a little in advance of the forward end of the centre-beam, and a draught-iron or loop, $d$, is provided for drawing the cultivator. Other loops, $d'$, may be attached to the forward ends of the plow-beams for the same purpose.

When my improved cultivator is used for turning the furrows outward, the plow-beams are attached to the centre-beam, as shown in fig. 2, bringing the handles directly over the apex or connected ends of the three beams. (The beam B, shown in red lines in fig. 2, is only to represent the position of the same beam when changed from one side of the centre-beam to the other, and connected at the opposite ends of each.)

The cultivator put together, as shown in fig. 2, has the plows brought into position with the mould-boards turning outward, and these mould-boards turn the furrows outward toward the rows of corn, &c., at the same time covering the manure, weeds, &c., which were on the surface of the ground.

When it is desired to turn the furrows inward and cover the manure, weeds, &c., the braces or stays D are removed from the tops of the beams, and the bolt from the connected ends, each plow-beam placed on the opposite side of the centre-beam, (as the beam B, shown in red lines in fig. 2,) and these secured by the same bolt. The braces or stays D are then replaced, but on a different part of the beams, and, near the handles F, holes $g$, for the nutted bolts $a$, are made through all the beams. Thus, for turning the furrows inward, the cultivator assumes the form shown in figs. 1 and 3, with all the plows arranged for plowing their furrows inward.

This can be done quickly and easily by any farmer, without loosening or disturbing the plows, which, when once firmly secured to or "rusted" into the beams, are to remain.

The amount of time or labor required to change the plow-beams from one side of the centre-beam to the other, so as to turn the furrows outward or inward, is very small, compared with the advantages gained by this peculiar construction and arrangement of said beams, and this time and labor is more than compensated for by the very great convenience of this cultivator, (and the saving the cost of a second cultivator,) besides the performance of its work in a very superior and desirable manner.

The rear tooth H in the centre-beam is convenient for levelling the soil thrown up by the two inner plows, when turning their furrows inward toward each other, and also for dividing that portion of soil lying between the two inner furrows, when plowing outward; but I make no claim to this tooth, it being quite common in other cultivators.

What I claim as of my invention, and desire to secure by Letters Patent, is—

1. The construction and arrangement of the removable and changeable plow-beams B and B', and the centre-beam A, whereby the former may be applied or attached to the latter, at either end or side thereof, and changed from one side of the centre-beam to the other, so as to turn or plough the furrows outward or inward, without removing the plows from their beams, all substantially as and for the purpose described.

2. The combination, with the removable and changeable plow-beams B and B', as shown and described, of plows C, forming a double series, for the purpose and substantially as described.

R. I. BURBANK.

Witnesses:
GEO. S. DERBY,
HENRY F. McKEEVER.